Jan. 22, 1952 W. H. METZLER 2,583,272
REVERSING ATTACHMENT FOR GARDEN TRACTORS
Filed July 12, 1950 2 SHEETS—SHEET 1

William H. Metzler
INVENTOR.

BY *Clarence A. O'Brien*
*and Harvey B. Jacobson*
Attorneys

Jan. 22, 1952     W. H. METZLER     2,583,272
REVERSING ATTACHMENT FOR GARDEN TRACTORS
Filed July 12, 1950     2 SHEETS—SHEET 2
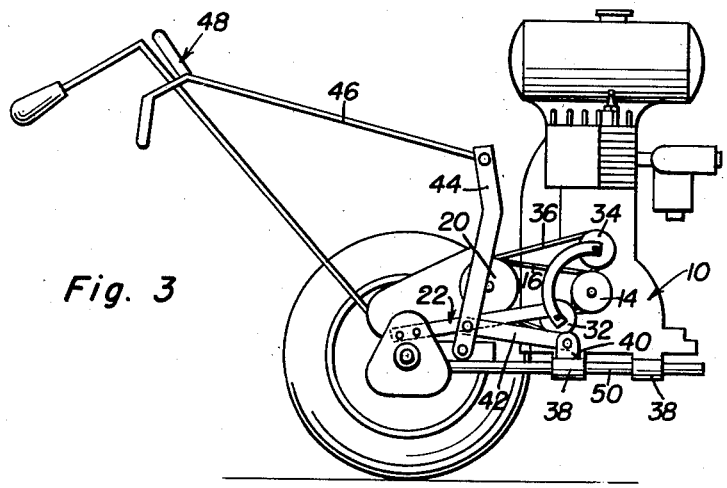
Fig. 3
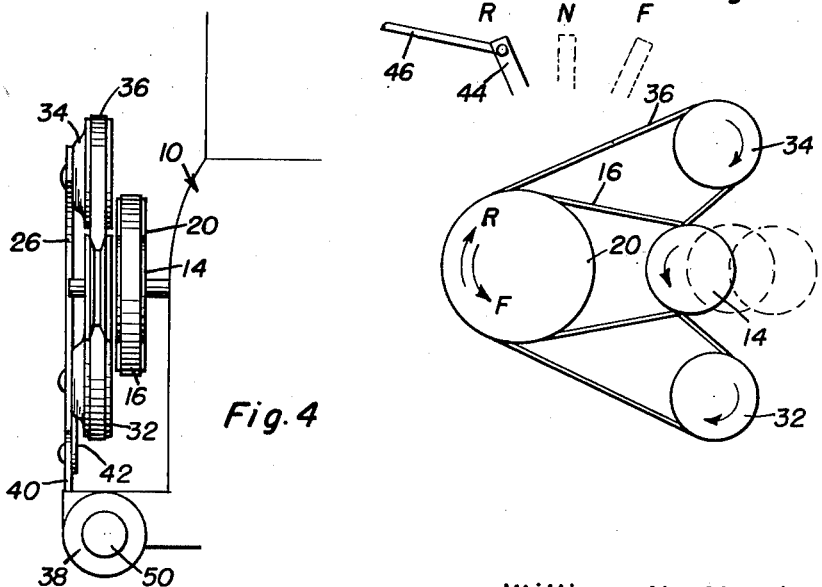
Fig. 4
Fig. 5
William H. Metzler
INVENTOR.

Patented Jan. 22, 1952

2,583,272

UNITED STATES PATENT OFFICE 2,583,272

REVERSING ATTACHMENT FOR GARDEN TRACTORS

William H. Metzler, Stirling, N. J., assignor of fifty per cent to May V. Metzler, Stirling, N. J.

Application July 12, 1950, Serial No. 173,455

4 Claims. (Cl. 74—220)

This invention relates to conversion units for garden tractors.

An object of this invention is to provide a conversion unit or assembly to render a garden type tractor capable of moving in reverse or idling at a "neutral" condition, when the garden tractor has as standard equipment only a mechanism to operate it in the forward direction.

Ancillary objects and features of importance will become apparent in following the description of the illustrated form of the invention.

In the drawings:

Figure 3 is a side view of the device showing it in condition for reverse movement, one wheel being removed to illustrate the structural detail;

Figure 4 is an enlarged elevational view showing the pulley arrangement forming a part of the invention;

Figure 5 is a schematic view illustrating the direction of movement of the pulleys and the means to cause forward, neutral and reverse actuation of the tractor;

Figure 1:
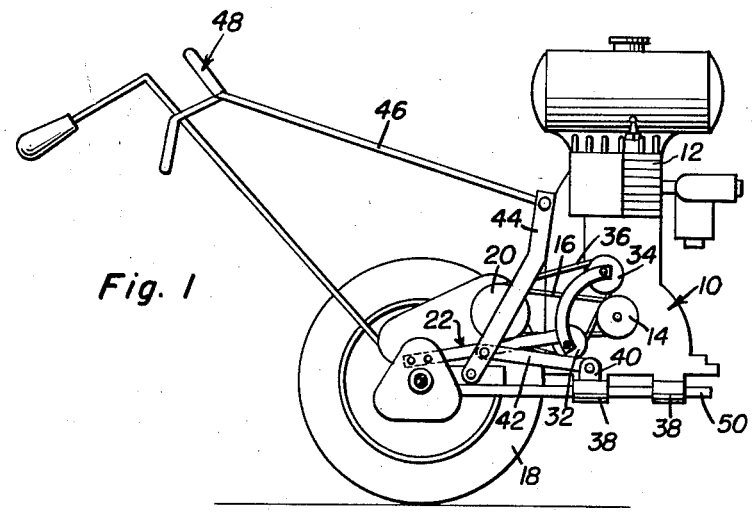
Figure 1 is an elevational view of the device showing it in such condition as to be capable of forward movement and having one wheel removed.
Figure 6:
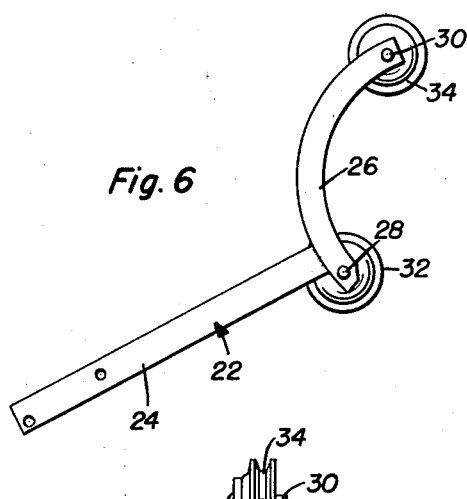
Figure 6 is an elevational view of a bracket carrying idler pulleys which forms a part of the invention.
Figure 2:
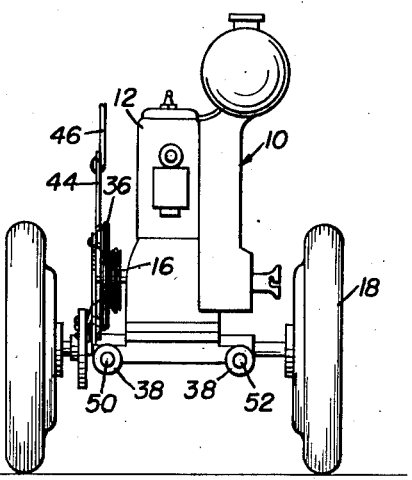
Figure 2 is a rear view of the structure in Figure 1.
Figure 7:
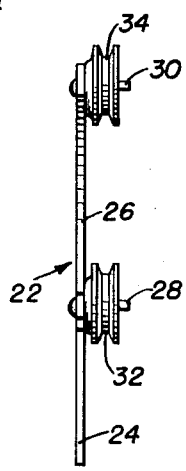
Figure 7 is an end view of the structure in Figure 6.

In carrying out this invention there is illustrated a conventional garden type tractor 10 which includes various necessary components. Such a tractor is provided with an engine or motor 12 from which extends a drive shaft having a drive pulley 14 attached thereto. Forming a part of a drive pulley and belt mechanism to operate the tractor in one direction, is the belt 16 which is disposed around a pulley and which is connected through conventional drive equipment in such a way as to actuate either one or both of the rear wheels 18 of the tractor. In lieu of this pulley there is supplied a double sheave or pulley 20, around which the belt 16 extends. With this equipment thus arranged, the tractor upon actuation of the engine is capable of moving forward.

The conversion assembly consists of the sheave or double pulley 20 and other structure including a substantially L-shaped bracket 22. This bracket has a leg 24 which is connected to the structural framing of the tractor 10 and a smoothly curved leg 26 which has spindles 28 and 30 at the ends thereof. Idler pulleys 32 and 34 are mounted for rotation on the spindles and there is an auxiliary belt 36 entrained therearound. This auxiliary belt is entrained around a part of the double pulley 20 to thereby complete its circuit.

The bracket 22 is mounted in such position on the framing of the tractor that a part of the belt 36 is disposed adjacent one side of the pulley 14. This is the side opposite from the side of the pulley 14 which is contacted by the belt 16.

It will be noted that in instances wherein the standard pulley 14 is a double one and the standard pulley or sheave 20 is a double one, the pulleys 14 and 20 may be used. But, where a single belt 16 system is employed, the pulleys 14 and 20 must be provided in lieu of the standard pulleys inasmuch as these pulleys have to be of the double type.

The motor 12 is provided with a plurality of bearings 38, which are of the sleeve type. A mounting bracket 40 rises from one of the bearings 38 and has a part of a linkage connected thereto. Specifically, the link 42 is pivoted at one end to the bracket 40 and at the other end to a lever 44 intermediate its ends. The lower end of the lever 44 is pivoted to a part of the framing of the tractor, while the supper end has a push rod 46 riveted or otherwise rigidly fixed thereto. A handle assembly 48 is arranged at the outer end of the rod 46 for manual operation thereof.

In operation the handle 48 is pushed or pulled depending upon whether it is desired to move the tractor forward or backward under its own power. If the handle 48 is pushed forward, the motor 12 together with the pulley 14 is moved forward on the tracks 50 and 52 which form a part of the framing of the tractor. This causes the belt 16 to be stretched tightly around the pulleys 14 and 20 causing forward operation of the tractor. At the same time the belt 36 is separated from its part of the pulley 14.

To move the handle 48 back slightly causes slippage between both of the belts and all of the pulleys. This will correspond to a "neutral" condition.

To move the handle 48 back even farther, the belt 16 becomes loose and slips on its pulleys, but the belt 36 becomes tightly engaged against its part of the pulley 14 and pulley 20 (Figure 5). This will cause the tractor to move rearwardly under its own power inasmuch as the direction of actuation of the belt 36 is opposite from that of the belt 16.

Having described the invention, what is claimed as new is:

1. In a garden tractor equipped with a drive pulley and a belt mechanism to operate the tractor in only one direction, a conversion assembly to render the tractor operable additionally in a reverse direction, said assembly comprising a bracket having a pair of spaced idler pulleys carried thereby, an auxiliary belt entrained around said idler pulleys and a part of said mechanism, a part of said auxiliary belt being disposed adjacent the side of said drive pulley opposite from that part of the drive pulley which is contacted by the belt of the mechanism, and means for displacing said drive pulley to drivingly contact selected belts.

2. In a garden tractor equipped with a drive pulley and a belt mechanism to operate the tractor in only one direction, a conversion assembly to render the tractor operable additionally in a reverse direction, said assembly comprising a bracket having a pair of spaced idler pulleys carried thereby, an auxiliary belt entrained around said idler pulleys and a part of said mechanism, a part of said auxiliary belt being disposed adjacent the side of said drive pulley opposite from that part of the drive pulley which is contacted by the belt of the mechanism, and means for displacing said drive pulley to drivingly contact selected belts including a track, a motor, means slidably mounting said motor on said track, said drive pulley being connected with said motor, and a linkage secured to said motor mounting means to slide said motor on said track.

3. In combination with a garden tractor having a motor with a frame and the motor mounted for displacement on the frame, a double pulley secured to the motor for operation thereby, a double sheave forming a part of the means to transmit movement to the wheels of the tractor, a first belt entrained around one part of said double pulley and one part of said double sheave whereby when the motor is located in one position the double sheave will be rotated in one direction, and means operatively connected with the other parts of said double pulley and said double sheave to operate said double sheave in the opposite direction, said last mentioned means comprising a mounting bracket with idler pulleys thereon and a second belt entrained therearound, said second belt being entrained around a part of said double sheave and adapted to contact the other part of said double pulley when the motor is moved to another position.

4. The combination of claim 3 and means connected to the motor for displacing the motor.

WILLIAM H. METZLER.

REFERENCES CITED

The following references are of record in the file of this patent:

UNITED STATES PATENTS

| Number | Name | Date |
|---|---|---|
| 463,532 | Moehle | Nov. 17, 1891 |
| 808,878 | Smith | Jan. 2, 1906 |
| 2,445,797 | Moore | July 27, 1948 |